United States Patent
Zhang et al.

(10) Patent No.: US 11,477,662 B2
(45) Date of Patent: Oct. 18, 2022

(54) METHOD FOR ARRANGING BASE STATIONS IN A COMMUNICATION NETWORK

(71) Applicant: City University of Hong Kong, Hong Kong (HK)

(72) Inventors: Yue Zhang, Hong Kong (HK); Lin Dai, Hong Kong (HK); Eric Wing-Ming Wong, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 0 days.

(21) Appl. No.: 17/348,805

(22) Filed: Jun. 16, 2021

(65) Prior Publication Data

US 2021/0392512 A1  Dec. 16, 2021

Related U.S. Application Data

(60) Provisional application No. 63/039,593, filed on Jun. 16, 2020.

(51) Int. Cl.
*H04W 16/18* (2009.01)
*H04W 28/02* (2009.01)

(52) U.S. Cl.
CPC ....... *H04W 16/18* (2013.01); *H04W 28/0205* (2013.01); *H04W 28/0226* (2013.01); *H04W 28/0242* (2013.01); *H04W 28/0247* (2013.01)

(58) Field of Classification Search
CPC ......... H04W 28/0226; H04W 28/0205; H04W 28/0247; H04W 28/0242; H04W 16/18
See application file for complete search history.

(56) References Cited

U.S. PATENT DOCUMENTS 5,826,218 A * 10/1998 Khafizov .............. H04W 16/18
455/445
6,097,956 A * 8/2000 Veeravalli ............. H04W 16/18
455/446

(Continued)

FOREIGN PATENT DOCUMENTS

| CN | 110351735 A | 10/2019 |
| CN | 110418354 A | 11/2019 |

(Continued)

OTHER PUBLICATIONS

Y. Lu et al., "Performance model and deployment strategy for mm-wave multi-cellular systems," in Proc. IEEE WOCC 2016, pp. 1-4.

(Continued)

*Primary Examiner* — Mehmood B. Khan
(74) *Attorney, Agent, or Firm* — Idea Intellectual Limited; Margaret A. Burke; Sam T. Yip

(57) ABSTRACT

The present invention provides a method and a system for arranging base stations in a millimeter wave communication network. The method establishes a stochastic optimization framework for millimeter-wave base station deployment in the urban street geometry and provides a low-complexity user association arrangement which can well balance the workloads among BSs and reduce the outage probability by taking the time-varying nature of user equipments' positions and the susceptibility of millimeter-wave links to blockage effect into account. Compared with the state-of-the-art approaches, the present invention can effectively and efficiently reduce the outage probability in the long term.

14 Claims, 6 Drawing Sheets

(56) References Cited

U.S. PATENT DOCUMENTS

| | | | | |
|---|---|---|---|---|
| 6,539,221 | B1* | 3/2003 | Vasudevan | H04W 16/18 455/67.11 |
| 2009/0143064 | A1* | 6/2009 | Bernini | H04W 16/18 455/423 |
| 2015/0009857 | A1* | 1/2015 | Rath | H04L 43/091 370/254 |

FOREIGN PATENT DOCUMENTS

| | | | | |
|---|---|---|---|---|
| WO | WO-2004025980 A1 * | 3/2004 | | H04W 16/18 |
| WO | WO-2007071271 A1 * | 6/2007 | | H04W 16/18 |
| WO | WO-2019043286 A1 * | 3/2019 | | G01C 21/005 |

OTHER PUBLICATIONS

S. Szyszkowicz et al., "Automated placement of individual millimeter-wave wall-mounted base stations for line-of-sight coverage of outdoor urban areas," IEEE Wireless Commun. Lett., 2016, vol. 5, No. 3, pp. 316-319.

N. Palizban et al., "Automation of millimeter wave network planning for outdoor coverage in dense urban areas using wall-mounted base stations," IEEE Wireless Commun. Lett., 2017, vol. 6, No. 2, pp. 206-209.

I. Mavromatis et al, "Efficient millimeter-wave infrastructure placement for city-scale ITS," in Proc. IEEE VTC, 2019, pp. 1-5.

G. Athanasiou et al., "Optimizing client association for load balancing and fairness in millimeter-wave wireless networks," IEEE/ACM Trans. Netw., 2015, vol. 23, No. 3, pp. 836-850.

S. Goyal et al., "User association in 5G mmWave networks," in Proc. IEEE WCNC, 2017, pp. 1-6.

A. Alizadeh et al., "Load balancing user association in millimeter wave MIMO networks," IEEE Trans. Wireless Commun., 2019, vol. 18, No. 6, pp. 2932-2945.

C. Chaieb et al., "On the user association and resource allocation in HetNets with mmWave base stations," in Proc. IEEE PIMRC 2017, pp. 1-5.

Yue Zhang et al., "Optimal BS Deployment and User Association for 5G Millimeter Wave Communication Networks", IEEE, 2020, pp. 2776-2791.

* cited by examiner

METHOD FOR ARRANGING BASE STATIONS IN A COMMUNICATION NETWORK

CROSS-REFERENCE TO RELATED APPLICATIONS

The present application claims priority from U.S. Provisional Patent Application No. 63/039,593 filed Jun. 16, 2020, and the disclosure of which is incorporated herein by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to communication networks. More specifically, the present invention relates to techniques of base station (BS) deployment arrangement and a user association arrangement to reduce the long-term outage probability of a millimeter wave (mmWave) communication network.

BACKGROUND OF THE INVENTION

To meet the booming data traffic demand, the millimeter wave (mmWave) communication networks, which adopt the mmWave bands from 30 to 300 GHz, have become an indispensable part of the Fifth Generation (5G) communication systems. Despite abundant spectrum resources, however, mmWave transmissions suffer from severe signal attenuation and are susceptible to blockage. As a result, the coverage areas of mmWave base stations (BSs) usually have irregular shapes and are closely determined by the layout of obstacles, which necessitates delicate BS deployment schemes for mmWave communication networks. Moreover, to combat the high path loss, mmWave BSs are usually densely deployed, with which the connectivity between users and mmWave BSs would change quickly as users move around. How to properly associate users with BSs is, therefore, another critical problem for mmWave communication networks.

BS deployment and user association are two important issues in wireless communication systems and have been extensively studied in the past decades. In traditional cellular systems, BSs are usually deployed to achieve seamless coverage of the network. Whether a user can be covered by one BS is determined by the distance between them. However, such distance-based BS deployment schemes are not suitable for mmWave communication networks, where the blockage effect becomes more pronounced. If mmWave BSs are deployed by only considering the distances to users, it can be expected that the transmissions between some BSs and users could be easily blocked by the surrounding obstacles. Therefore, there is an essential need to re-design BS deployment schemes for mmWave communication networks. Furthermore, in order to compensate for the high path loss, mmWave BSs usually employ a massive number of antennas to form narrow beams, which result in significant reduction of co-channel interference. Consequently, user association metrics for interference-limited wireless networks are not well suited to noise-limited mmWave communication networks. New user association approaches should be customized for mmWave communication networks without considering interference coordination.

There have been many proposed designs of BS deployment and user association for mmWave communication networks.

To determine the optimal positions of BSs, a static blockage model was adopted in [1]-[4], where the positions, shapes and orientations of obstacles are fixed. To maximize the line-of-sight (LoS) coverage of the mmWave network, various assumptions on the feasible positions of BSs were made in [1], [2]. In [1], the region under consideration was divided into quadrilateral or triangle areas, and the mmWave BSs were deployed at the intersection points of areas. Different from [19] where mmWave BSs were placed in the open space, in [2], the BSs were assumed to be deployed on the façade of buildings. The shapes of buildings were approximated by simple polygons, and the optimal positions of BSs were determined by applying the computational geometry theory. The user-position-dependent BS deployment schemes were further studied in [3] and [4], where users are represented by reference points (RPs) with given positions. By generating the candidate sites (CSs) of BSs based on the BS deployment scheme proposed in [2], the optimal subsets of CSs were searched for covering the maximum number of RPs [3], or satisfying the received signal strength requirement at each RP with the minimum number of BSs [4].

However, in the above methods, the BS deployment problem is formulated as a deterministic optimization problem, where the objective function is calculated based on a given set of fixed users' positions. In practice, however, as the positions of users vary with time, the optimal BS deployment based on such a deterministic optimization framework would quickly become obsolete when the users' positions change.

To optimize user association, the load-balancing user association schemes for mmWave networks have gained much attention in recent years and have been studied in [5]-[8], where the workload of each BS, e.g., the number of users that can be served by one BS, is strictly bounded. In [5], for instance, a distributed algorithm was proposed to minimize the maximum workload among the access points. In [6], user association and spectrum resource allocation are jointly optimized for maximizing the downlink sum-rate and minimizing the reallocation cost of handovers simultaneously. In [7], a load balancing user association scheme was proposed to maximize the network utility function, which can be the downlink sum-rate or the minimum downlink rate among the users. In [8], a heuristic algorithm was proposed to jointly maximize the number of users that can associate with one BS and minimize the total number of time-frequency resource blocks consumed by the BSs.

However, in the above studies, the focus is usually placed on balancing the workloads of BSs. The outage probability, i.e., the proportion of the users that cannot be served by any BSs, is an important performance metric for mmWave networks, which nevertheless, has seldom been considered when optimizing the user association.

Generally, whether a UE can associate with one BS is determined by both the user association scheme and the physical accessibility between the UE and the BS, i.e., the UE is within the coverage area of the BS and there exists an LoS path between them. The physical accessibility between a BS and a UE is closely related to their positions. Therefore, in order to improve the network outage performance, both the BS deployment and user association should be optimized.

LISTING OF REFERENCES

[1] Y. Lu, H.-W. Hsu, and L.-C. Wang, "Performance model and deployment strategy for mm-wave multi-cellular systems," in Proc. IEEE WOCC 2016, pp. 1-4.
[2] S. Szyszkowicz, A. Lou, and H. Yanikomeroglu, "Automated placement of individual millimeter-wave wall-mounted base stations for line-of-sight coverage of outdoor urban areas," IEEE Wireless Commun. Lett., vol. 5, no. 3, pp. 316-319, June 2016.
[3] N. Palizban, S. Szyszkowicz, and H. Yanikomeroglu, "Automation of millimeter wave network planning for outdoor coverage in dense urban areas using wall-mounted base stations," IEEE Wireless Commun. Lett., vol. 6, no. 2, pp. 206-209, April 2017.
[4] I. Mavromatis, A. Tassi, R. J. Piechocki, and A. Nix, "Efficient millimeter-wave infrastructure placement for city-scale ITS," in Proc. IEEE VTC 2019, pp. 1-5.
[5] G. Athanasiou, P. C. Weeraddana, C. Fischione, and L. Tassiulas, "Optimizing client association for load balancing and fairness in millimeter-wave wireless networks," IEEE/ACM Trans. Netw., vol. 23, no. 3, pp. 836-850, June 2015.
[6] S. Goyal, M. Mezzavilla, S. Rangan, S. Panwar, and M. Zorzi, "User association in 5G mmWave networks," in Proc. IEEE WCNC 2017, pp. 1-6.
[7] A. Alizadeh and M. Vu, "Load balancing user association in millimeter wave MIMO networks," IEEE Trans. Wireless Commun., vol. 18, no. 6, pp. 2932-2945, June 2019.
[8] C. Chaieb, Z. Mlika, F. Abdelkefi, and W. Ajib, "On the user association and resource allocation in HetNets with mmWave base stations," in Proc. IEEE PIMRC 2017, pp. 1-5.

The disclosures of the above-listed references are incorporated herein by reference in their entities.

SUMMARY OF THE INVENTION

According to one aspect of the present invention, a method for minimizing an outage probability of a millimeter wave (mmWave) communication network is provided. The method comprises the steps of: designing an optimal deployment of an M number of base stations (BSs), including optimized positions of the plurality of BSs, $r^{BS}*$, serving for an N number of user equipment (UEs), in an urban area $\mathcal{A}$ with a building-block geometry, to maximize a long-term performance of an average number of accessible BSs, with a sample of positions of the N number of UEs under a bounded inaccessible probability constraint; and matching the N number of UEs with the M number of BSs based on the optimized positions of the M number of BSs, $r^{BS}*$, in a given time slot to minimize an outage probability, Po, which is defined as the proportion of the N number of UEs that cannot associate with any of the M number of BSs, under a first matching constraint that a UE n can associate with a BS m only if the BS m is physically accessible for the UE n, a second matching constraint that each of the M number BSs has a maximum workload, and a third matching constraint that each UE can only associate with one BS, where m=1, 2, ..., M, and n=1, ..., N.

According to another aspect of the present invention, a system for communication network optimization, comprising a processor configured to: design an optimal deployment of an M number of base stations (BSs), including optimized positions of the plurality of BSs, $r^{BS}*$, serving for an N number of user equipment (UEs), in an effective area with a building-block geometry, to maximize a long-term performance of an average number of accessible BSs, with a sample of positions of the N number of UEs, under a bounded inaccessible probability constraint; and match, based on the optimized positions of the M number of BSs, $r^{BS}*$, the N number of UEs with the M number of BSs, in a given time slot, to minimize an outage probability, Po, which is defined as the proportion of the N number of UEs that cannot associate with any of the M number of BSs, under a first matching constraint that a UE n can associate with a BS m only if the BS m is physically accessible for the UE n, a second matching constraint that each of the M number BSs has a maximum workload, and a third matching constraint that each UE can only associate with one BS.

According to a further aspect of the present invention, a mmWave communication network with minimized outage probability is provided. The communication network comprises: an M number of base stations (BSs) accessible by an N number of user equipment (UEs) within an effective area $\mathcal{A}$ is provided. The M number of BSs are deployed at optimized positions for maximizing a long-term performance of an average number of accessible BSs under a bounded inaccessible probability constraint. The N number of UEs are matched with the M number of BSs deployed on the optimized positions to minimize the proportion of the N number of UEs that cannot associate with any of the M number of BSs under a first matching constraint that a UE n can associate with a BS m only if the BS m is physically accessible for the UE n, a second matching constraint that each of the M number BSs has a maximum workload, and a third matching constraint that each UE can only associate with one BS.

A salient characteristic of millimeter-wave communication is its susceptibility to blockage effect, which may cause severe outage events across the network. The outage events may be modelled based on the following assumptions: 1) each BS has a circular coverage range. One UE can physically access one BS only if it is within the coverage range of the BS and the line-of-sight (LoS) path between them is not blocked by any buildings; 2) each BS can only serve at most a certain number of UEs, which is referred to as the maximum workload; and 3) each UE can only be served by one BS.

Based on the above modeling, the present invention establishes a stochastic optimization framework for millimeter-wave BS deployment in the urban street geometry and provides a low-complexity user association arrangement which can well balance the workloads among BSs and reduce the outage probability by taking the time-varying nature of UEs' positions and the susceptibility to blockage effect into account. Compared with the state-of-the-art approaches, the present invention can effectively and efficiently reduce the outage probability in the long term.

BRIEF DESCRIPTION OF THE DRAWINGS

Embodiments of the invention are described in more detail hereinafter with reference to the drawings, in which.

DETAILED DESCRIPTION

In the following description, methods for minimizing outage probability of a millimeter wave (mmWave) communication network and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
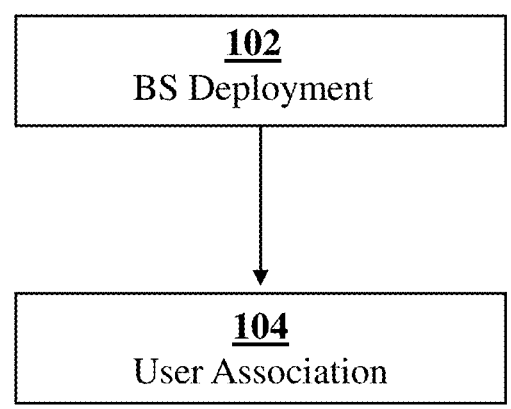
FIG. 1 depicts a flowchart of a method for minimizing an outage probability of a millimeter wave (mmWave) communication network in accordance with a preferred embodiment of the present invention.

FIG. 1 depicts a flowchart of a method for minimizing an outage probability of a millimeter wave (mmWave) communication network in accordance with a preferred embodiment of the present invention.

Figure 2:
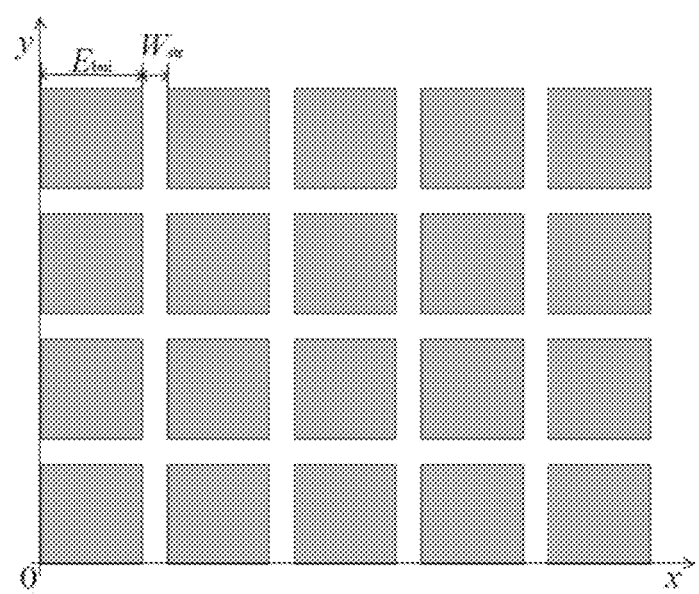
FIG. 2 depicts a 2-dimensional Manhattan-type urban street geometry used in a preferred embodiment of the present invention.

The mmWave communication network include an M number of base stations (BSs) serving for an N number of user equipment (UEs) in an urban area $\mathcal{A}$ having a 2-dimensional Manhattan-type urban street geometry as shown in FIG. 2, where a B number of square blocks (i.e. buildings) with edge length $E_{bui}$ are separated by streets width $W_{str}$. In the following description, a Cartesian coordinate is considered and the position of UE n, BS m and center of block b are denoted as $r_n^{UE}=[x_n^{UE}, y_n^{UE}]$ n=1, ..., N, $r_m^{BS}=[x_m^{BS}, y_m^{BS}]$, m=1, $r_b^{block}=[x_b^{block}, y_b^{block}]$, b=1, ..., B, respectively.

Referring to FIG. 1. The method may comprise a step 102: designing an optimal deployment of the base stations (BSs), including optimized positions of the BSs, $r^{BS*}$, to maximize a long-term performance of an average number of accessible BSs, with a sample of positions of the N number of UEs, under a bounded inaccessible probability constraint.

The long-term performance of an average number of accessible BSs is considered based on the fact that the positions of UEs are time-varying due to the mobility. In some embodiments, the long-term performance of an average number of accessible BSs may be obtained by an expectation operator $\mathbb{E}[\cdot]$ and represented by $\mathbb{E}_{\{r_n^{UE}\}}[\vec{M}_{ac}]$, where $\vec{M}_{ac}$ denotes the average number of accessible BSs and $\mathbb{E}_{\{r_n^{UE}\}}[\vec{M}_{ac}]$ denotes a long-term average performance of the average number of accessible BSs, $\vec{M}_{ac}$.

The bounded inaccessible probability constraint is formulated to ensure fairness among UEs while the number of accessible BSs for each UE is maximized so as to provide more freedom for user association.

The bounded inaccessible probability constraint may be defined as $\mathbb{E}_{\{r_n^{UE}\}}[P_{iac}] \leq P_{iac}^*$ with respect to the positions of the M number of BSs, $r_m^{BS} \in \mathcal{A}$, m=1, ..., M, i.e., $r^{BS}=[r_1^{BS}, ..., r_M^{BS}] \in \mathcal{A}^M$, where $P_{iac}$ is the inaccessible probability representing the proportion of the N number of UEs that cannot access any one of the M number of BSs, $\mathbb{E}_{\{r_n^{UE}\}}[P_{iac}]$ is the expectation operator on $P_{iac}$ and denotes a long-term average performance of the inaccessible probability $P_{iac}$, and $P_{iac}^*$ denotes a bounded value for $P_{iac}$.

Therefore, the step 102 is to solve a BS deployment problem that can be formulated as:

$$(P1): \max_{\{r_m^{BS}\}} \mathbb{E}_{\{r_n^{UE}\}}[\vec{M}_{ac}]$$

$$\text{s.t. } \mathbb{E}_{\{r_n^{UE}\}}[P_{iac}] \leq P_{iac}^*,$$

$$r_m^{BS} \in \mathcal{A}, m = 1, \ldots, M.$$

The inaccessible probability, $P_{iac}$, is dependent on coverage and blockage performance of the mmWave communication network and defined by:

$$P_{iac} = \frac{1}{N}\sum_{n=1}^{N}\sum_{m=1}^{M} I(\mathcal{I}_{m,n}^{out} + \mathcal{I}_{m,n}^{block}).$$

The average number of accessible BSs, $\vec{M}_{ac}$, is dependent on coverage and blockage performance of the mmWave communication network and defined by:

$$\vec{M}_{ac} = \frac{1}{N}\sum_{n=1}^{N}\sum_{m=1}^{M}(1 - I(\mathcal{I}_{m,n}^{out} + \mathcal{I}_{m,n}^{block}));$$

where $\mathcal{I}_{m,n}^{out}$, denotes a plurality of out-of-coverage indicator functions respectively indicating if a UE n is outside the coverage range of a BS m, and $\mathcal{I}_{m,n}^{block}$ denotes a plurality of blockage indicator functions respectively indicating if there is no light of sight (LoS) path between the BS m and the UE n.

In order to reduce approximation error and avoid vanishing gradient, the expressions of $P_{iac}$ and $\vec{M}_{ac}$ can be rewritten as:

$$P_{iac} = \frac{1}{N}\sum_{n=1}^{N}\left(\prod_{m=1}^{M}\mathcal{I}_{m,n}^{out} + \sum_{m\in\mathcal{M}_n}\mathcal{I}_{m,n}^{block}\right) \text{ and}$$

$$\vec{M}_{ac} = M - \frac{1}{N}\sum_{n=1}^{N}\left(\sum_{m=1}^{M}\mathcal{I}_{m,n}^{out} + \sum_{m\in\mathcal{M}_n}\mathcal{I}_{m,n}^{block}\right),$$

respectively;

where $\mathcal{M}_n = \{m \in \mathcal{M} : d_{m,n} \leq R\}$ denotes the set of BSs that include UE n in their coverage areas.

The out-of-coverage indicator functions $\mathcal{I}_{m,n}^{out}$ may be Boolean indicators and expressed as:

$$\mathcal{I}_{m,n}^{out} = \begin{cases} 1 & \text{if } UE\ n \text{ is outside the coverage range of } BS\ m \\ 0 & \text{otherwise,} \end{cases}$$

The expression of $\mathcal{I}_{m,n}^{out}$ can be also written as:
$\mathcal{I}_{m,n}^{out} = I(d_{m,n} - R)$, where R is the coverage radius of each BS based on the assumption that each BS has a circular coverage range and $d_{m,n}$ denotes the distance between BS m and UE n.

The blockage indicator functions $\mathcal{I}_{m,n}^{\text{out}}{}_{m,n}^{block}$ may be Boolean indicators and expressed as:

$$I_{m,n}^{block} = \begin{cases} 1 & \text{if there is no LoS path between BS } m \text{ and UE } n \\ 0 & \text{otherwise} \end{cases}$$

The expression of $\mathcal{I}_{m,n}^{\text{out}}{}_{m,n}^{block}$ can be also written as:

$$I_{m,n}^{block} = I\Bigg(\sum_{b=1}^{B} I((d_{m,n}\sin\theta_{m,n} + E_{bui})$$

$$\left(x_{m,n,b}\sin\theta_{m,n} - y_{m,n,b}\cos\theta_{m,n} + \frac{d_{m,n}\sin\theta_{m,n}}{2} + \frac{E_{bui}}{2}\right)\Bigg).$$

$$I\left((d_{m,n}\cos\theta_{m,n} + E_{bui})\left(x_{m,n,b}\cos\theta_{m,n} + y_{m,n,b}\sin\theta_{m,n} + \frac{d_{m,n}\cos\theta_{m,n}}{2} + \frac{E_{bui}}{2}\right)\right).$$

$$I\left((\sin\theta_{m,n} + \cos\theta_{m,n})\left(y_{m,n,b} + \frac{E_{bui}}{2}\sin\theta_{m,n} + \frac{E_{bui}}{2}\cos\theta_{m,n}\right)\right) \cdot I$$

$$\left((d_{m,n}\sin\theta_{m,n} + E_{bui})\left(-x_{m,n,b}\sin\theta_{m,n} + y_{m,n,b}\cos\theta_{m,n} + \frac{d_{m,n}\sin\theta_{m,n}}{2} + \frac{E_{bui}}{2}\right)\right).$$

$$I\left((d_{m,n}\cos\theta_{m,n} + E_{bui})\right.$$

$$\left(-x_{m,n,b}\cos\theta_{m,n} - y_{m,n,b}\sin\theta_{m,n} + \frac{d_{m,n}\cos\theta_{m,n}}{2} + \frac{E_{bui}}{2}\right)\Bigg).$$

$$I\left((\sin\theta_{m,n} + \cos\theta_{m,n})\left(-y_{m,n,b} + \frac{E_{bui}}{2}\sin\theta_{m,n} + \frac{E_{bui}}{2}\cos\theta_{m,n}\right)\right)\Bigg)$$

where $x_{m,n,b}$ is given by:

$$x_{m,n,b} = \left(x_b^{block} - \frac{x_n^{UE} + x_m^{BS}}{2}\right)\cos\arctan\frac{y_n^{UE} - y_m^{BS}}{x_n^{UE} - x_m^{BS}} +$$

$$\left(y_b^{block} - \frac{y_n^{UE} + y_m^{BS}}{2}\right)\sin\arctan\frac{y_n^{UE} - y_m^{BS}}{x_n^{UE} - x_m^{BS}};$$

$y_{m,n,b}$ is given by:

$$y_{m,n,b} = \left(y_b^{block} - \frac{y_n^{UE} + y_m^{BS}}{2}\right)\cos\arctan\frac{y_n^{UE} - y_m^{BS}}{x_n^{UE} - x_m^{BS}} -$$

$$\left(x_b^{block} - \frac{x_n^{UE} + x_m^{BS}}{2}\right)\sin\arctan\frac{y_n^{UE} - y_m^{BS}}{x_n^{UE} - x_m^{BS}};$$

and $\theta_{m,n}$ is given by:

$$\theta_{m,n} = -\arctan\frac{y_n^{UE} - y_m^{BS}}{x_n^{UE} - x_m^{BS}} + \frac{\pi}{2}I\left(\arctan\frac{y_n^{UE} - y_m^{BS}}{x_n^{UE} - x_m^{BS}}\right).$$

In modeling the indicator functions $\mathcal{I}_{m,n}^{\text{out}}{}_{m,n}^{out}$; and $\mathcal{I}_{m,n}^{\text{out}}{}_{m,n}^{out}$, it is assumed that one user can physically access one BS only if it is within the coverage range of the BS and the line-of-sight (LoS) path between them is not blocked by any buildings.

Figure 3:
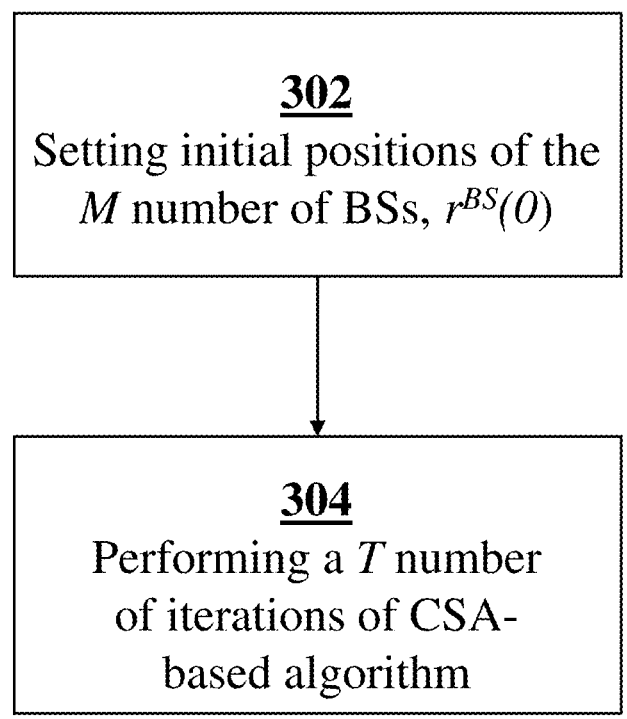
FIG. 3 depicts the steps of the CSA-based scheme according to one embodiment of the present invention.

Preferably, the optimized positions of the M number of BSs, $r^{BS*}$, are determined by using a cooperative stochastic approximation (CSA) based scheme. FIG. 3 depicts the steps of the CSA-based scheme according to one embodiment of the present invention. Referring to FIG. 3, the CSA-based scheme may comprise the steps of: 302: setting initial positions of the M number of BSs, $r^{BS}(0)$; and 304: iteratively updating the positions of the M number of BSs by performing a T number of iterations of a CSA-based algorithm based on stochastic gradients related to the average number of accessible BSs, $\vec{M}_{ac}$, or the inaccessible probability, $P_{iac}$, which are in turn dependent on coverage and blockage performance of the mmWave communication network.

Figure 4:
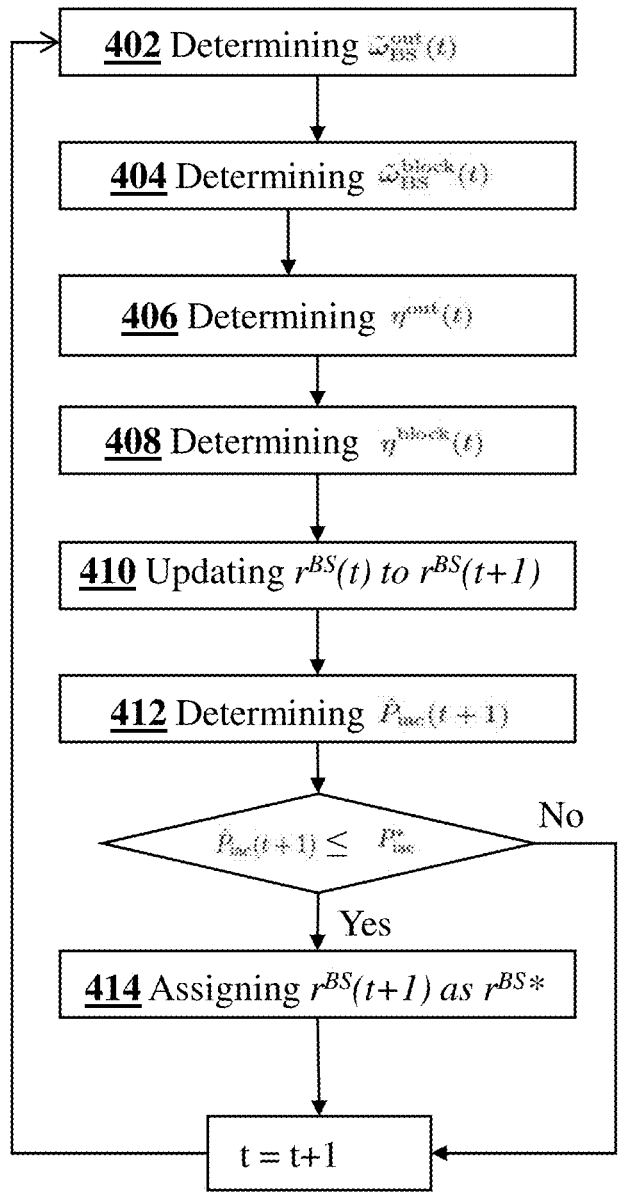
FIG. 4 depicts the steps of each iteration of CSA-based algorithm according to one embodiment of the present invention.

FIG. 4 depicts the steps of each iteration of the CSA-based algorithm according to one embodiment of the present invention. Referring to FIG. 4, for an iteration index $t=0, 1, \ldots, T-1$, a $t^{th}$ iteration may include the steps of:

402: determining, with a sample of the N number of UEs' positions $r^{UE}(t)$, a stochastic gradient $\tilde{\omega}_{BS}^{out}(t)$ related to a plurality of out-of-coverage indicator functions $\mathcal{I}_{m,n}^{\text{out}}{}_{m,n}^{out}(t)$ at the $t^{th}$ iteration;

404: determining, with a sample of the N number of UEs' positions $r^{UE}(t)$, a stochastic gradient $\tilde{\omega}_{BS}^{out}(t)$ related to a plurality of blockage indicator functions $\mathcal{I}_{m,n}^{\text{out}}{}_{m,n}^{out}(t)$ at the $t^{th}$ iteration;

406: determining a step size $\eta^{out}(t)$ based on the determined stochastic gradient $\tilde{\omega}_{BS}^{out}(t)$;

408: determining a step size $\eta^{block}(t)$ based on the determined stochastic gradient $\tilde{\omega}_{BS}^{block}(t)$;

410: updating positions of the M number of BSs from $r^{BS}(t)$ to $r^{BS}(t+1)$ based on the determined stochastic gradients $\tilde{\omega}_{BS}^{out}(t)$ and $\tilde{\omega}_{BS}^{block}(t)$, the determined step sizes $\eta^{out}(t)$ and $\eta^{block}(t)$;

412: determining, with the updated positions of the M number of BSs, $r^{BS}(t+1)$, an updated unbiased estimation of inaccessible probability, $\hat{P}_{iac}(t+1)$; and 414: assigning the updated positions of the M number of BSs, $r^{BS}(t+1)$, as the optimized positions of the M number of BSs, $r^{BS*}$, if the updated unbiased estimation of inaccessible probability, $\hat{P}_{iac}(t+1)$, is smaller or equal to the bounded value $P_{iac}*$.

The stochastic gradient $\tilde{\omega}_{BS}^{out}(t)$ may be given by:

$$\tilde{\omega}_{BS}^{out}(t) = \begin{cases} \frac{1}{N}\sum_{n=1}^{N}\sum_{m=1}^{M}\frac{\partial \mathcal{I}_{m,n}^{out}(t)}{\partial r^{BS}(t)} & \text{if } \hat{P}_{iac}(t) - P_{iac}^* \le 0 \\ \frac{1}{N}\sum_{n=1}^{N}\sum_{m=1}^{M}\prod_{i=1,i\ne m}^{M} \mathcal{I}_{i,n}^{out}(t)\frac{\partial \mathcal{I}_{m,n}^{out}(t)}{\partial r^{BS}(t)} & \text{otherwise} \end{cases};$$

where $\mathcal{M}_{m,n}^{out}(t)$ is a plurality of indicator functions indicating if a UE n is outside the coverage range of a BS m at the $t^{th}$ iteration.

The stochastic gradient $\tilde{\omega}_{BS}^{block}(t)$ maybe given by:

$$\tilde{\omega}_{BS}^{block}(t) = \begin{cases} \frac{1}{N}\sum_{n=1}^{N}\sum_{m\in\mathcal{M}_n}\frac{\partial \mathcal{I}_{m,n}^{block}(t)}{\partial r^{BS}(t)} & \text{if } \hat{P}_{iac}(t) - P_{iac}^* \le 0 \\ \frac{1}{N}\sum_{n=1}^{N}\sum_{m\in\mathcal{M}_n}\prod_{i\in cal M_n, i\ne m} \mathcal{I}_{i,n}^{block}(t)\frac{\partial \mathcal{I}_{m,n}^{block}(t)}{\partial r^{BS}(t)} & \text{otherwise.} \end{cases};$$

where $\mathcal{I}_{m,n}^{\text{out}}{}_{m,n}^{block}(t)$ denotes a plurality of indicator functions indicating if there is no light of sight (LoS) path between a BS m and a UE n at the $t^{th}$ iteration; and $\hat{P}_{iac}(t)$ is an unbiased estimation of $\mathbb{E}_{r^{UE}}[P_{iac}(t)]$ generated with a number of realization of UEs' positions at the $t^{th}$ iteration.

In various embodiment, the indicator functions I(x) in the expressions of $\tilde{\omega}_{BS}^{out}(t)$ and $\tilde{\omega}_{BS}^{block}(t)$ may be approximated by a sigmoid function:

$$I(x) \approx S(x) = \frac{1}{1 + \exp(-\beta x)};$$

with the parameter $\beta$ controlling the accuracy and steepness of $S(x)$. Preferably, the parameter $\beta$ is set as 1 for calculating $\tilde{\omega}_{BS}^{out}(t)$, and 0.001 for calculating $\tilde{\omega}_{BS}^{block}(t)$.

For stabilizing the CSA-based algorithm and balancing the effects of the movement of BSs on the coverage and blockage performance of the network, the step size $\eta^{out}(t)$ may be normalized by the norm of the gradient $\tilde{\omega}_{BS}^{out}(t)$ as:

$$\eta^{out}(t) = \frac{\kappa}{t^b \|\tilde{\omega}_{BS}^{out}(t)\|}; \text{ and}$$

the step size $\eta^{block}(t)$ may be normalized by the norm of the gradient $\tilde{\omega}_{BS}^{block}(t)$ as:

$$\eta^{block}(t) = \frac{\kappa}{t^b \|\tilde{\omega}_{BS}^{block}(t)\|};$$

where $\kappa \in (0; 100]$ and $b \in (0:5; 1]$ are two positive constants. The constant $\kappa$ mainly determines the step size in the first few iterations while the constant $b$ determines the asymptotic diminishing rate. The CSA-based algorithm may converge quickly to a sub-optimal solution with a small $\kappa$ or an over-sized $b$. While large $\kappa$ or small $b$ may cause instability of the CSA-based algorithm. The values of $\kappa$ and $b$ are fine-tuned to achieve good convergence performance of the CSA-based algorithm in different scenarios.

The positions of the M number of BSs, $r^{BS}(t+1)$ may be updated by using the following update:

$$r^{BS}(t+1) = \prod\nolimits_{\mathcal{A}^M} \left( r^{BS}(t) - \left( \tilde{\omega}_{BS}^{out}(t)\eta^{out}(t) + \tilde{\omega}_{BS}^{block}(t)\eta^{block}(t) \right) \right);$$

where $\prod \mathcal{A}^M(\cdot)$ denotes a Euclidean projection of positions of the M number of BSs, $r^{BS}(t)$, on the set of $\mathcal{A}^M$, i.e., $\prod \mathcal{A}^M(\cdot)$ returns the positions of the plurality of BSs, $r^{BS}(t+1)$, for which the term $(r^{BS}(t)-(\tilde{\omega}_{BS}^{out}(t)\ \eta^{out}(t) + \tilde{\omega}_{BS}^{block}(t)\ \eta^{block}(t)))$ attains the smallest distance to the feasible set $\mathcal{A}^M$.

Referring back to FIG. 1. The method may further comprise a step 104: matching the N number of UEs with the M number of BSs based on the optimized positions of the M number of BSs, $r^{BS}*$, in a given time slot to minimize an outage probability, Po, which is defined as the proportion of the N number of UEs that cannot associate with any of the M number of BSs, under a first matching constraint that a UE n can associate with a BS m only if the BS n is physically accessible for the UE n, a second matching constraint that each of the M number BSs has a maximum workload, and a third matching constraint that each UE can only associate with one BS, where m=1, 2, . . . , M, and n=1, . . . , N.

Preferably, the outage probability, $P_o$, of the N number of UEs that cannot associate with any of the M number of BSs is given by:

$$P_o = 1 - \frac{1}{N} \sum_{n=1}^{N} \sum_{m=1}^{M} \mathcal{I}_{m,n}^{associate};$$

where $\mathcal{I}_{m,n}^{out}{}_{m,n}^{associate}$ denotes a plurality of user association indicator functions respectively indicating if a UE n associates with a BS m.

The user association indicator functions $\mathcal{I}_{m,n}^{out}{}_{m,n}^{associate}$ may be Boolean indicators and defined as:

$$\mathcal{I}_{m,n}^{associate} = \begin{cases} 1 & \text{if } UE \ n \text{ associates with } BS \ m \\ 0 & \text{otherwise}. \end{cases}$$

Preferably, the first matching constraint is modelled based on the assumption that one UE can be associated with one BS only if it is within the coverage range of the BS and the line-of-sight (LoS) path between them is not blocked by any buildings, and thus defined by:

$$\mathcal{I}_{m,n}^{out}{}_{m,n}^{associate} \leq 1 - I(\mathcal{I}_{m,n}^{out}{}_{m,n}^{out} + \mathcal{I}_{m,n}^{out}{}_{m,n}^{associate})$$

where $\mathcal{I}_{m,n}^{out}{}_{m,n}^{out}$ denotes a plurality of out-of-coverage indicator functions respectively indicating if a UE n is outside the coverage range of a BS m, and $\mathcal{I}_{m,n}^{out}{}_{m,n}^{block}$ denotes a plurality of blockage indicator functions respectively indicating if there is no light of sight (LoS) path between a BS m and a UE n.

Preferably, the second matching constraint is modelled based on the assumption that each BS has a maximum workload, and thus defined by:

$$\sum_{n=1}^{N} \mathcal{I}_{m,n}^{associate} \leq C, m = 1, \ldots, M,$$

where C is the maximum number of UEs that each BS can serve.

Preferably, the third matching constraint is modelled based on the assumption that each user can only be served by one BS, and thus defined by:

$$\sum_{M=1}^{M} \mathcal{I}_{m,n}^{associate} \leq 1, n = 1, \ldots, N.$$

Therefore, the step 104 is to solve a user association problem that can be formulated as:

$$(P2): \min_{\{\mathcal{I}_{m,n}^{associate}\}} P_o$$

$$\text{s.t. } \mathcal{I}_{m,n}^{associate} \leq 1 - I\left(\text{cal } \mathcal{I}_{m,n}^{out} + \mathcal{I}_{m,n}^{block}\right),$$

$$\sum_{n-1}^{N} \mathcal{I}_{m,n}^{associate} \leq C, m = 1, \ldots, M,$$

$$\sum_{m-1}^{M} \mathcal{I}_{m,n}^{associate} \leq 1, n = 1, \ldots, N,$$

$$\mathcal{I}_{m,n}^{associate} \in \{0, 1\}.$$

The matching of the N number of UEs with the M number of BSs is performed by using a low-complexity sub-optimal user association scheme.

Figure 5:
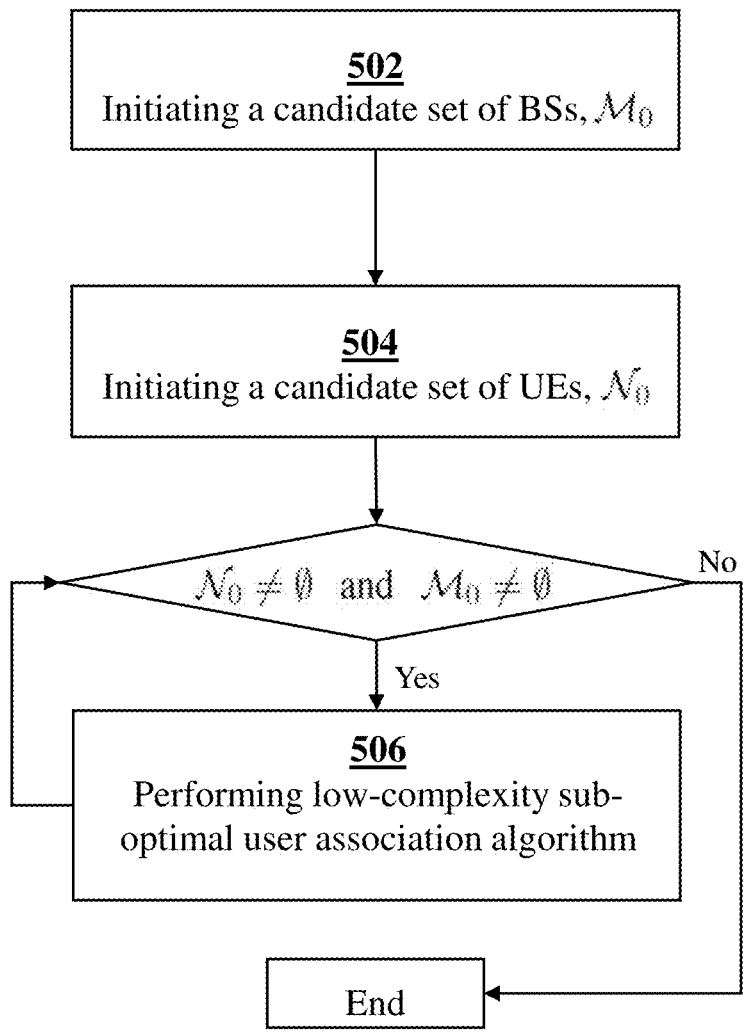
FIG. 5 depicts steps of the low-complexity sub-optimal user association scheme according to one embodiment of the present invention.
Figure 6:
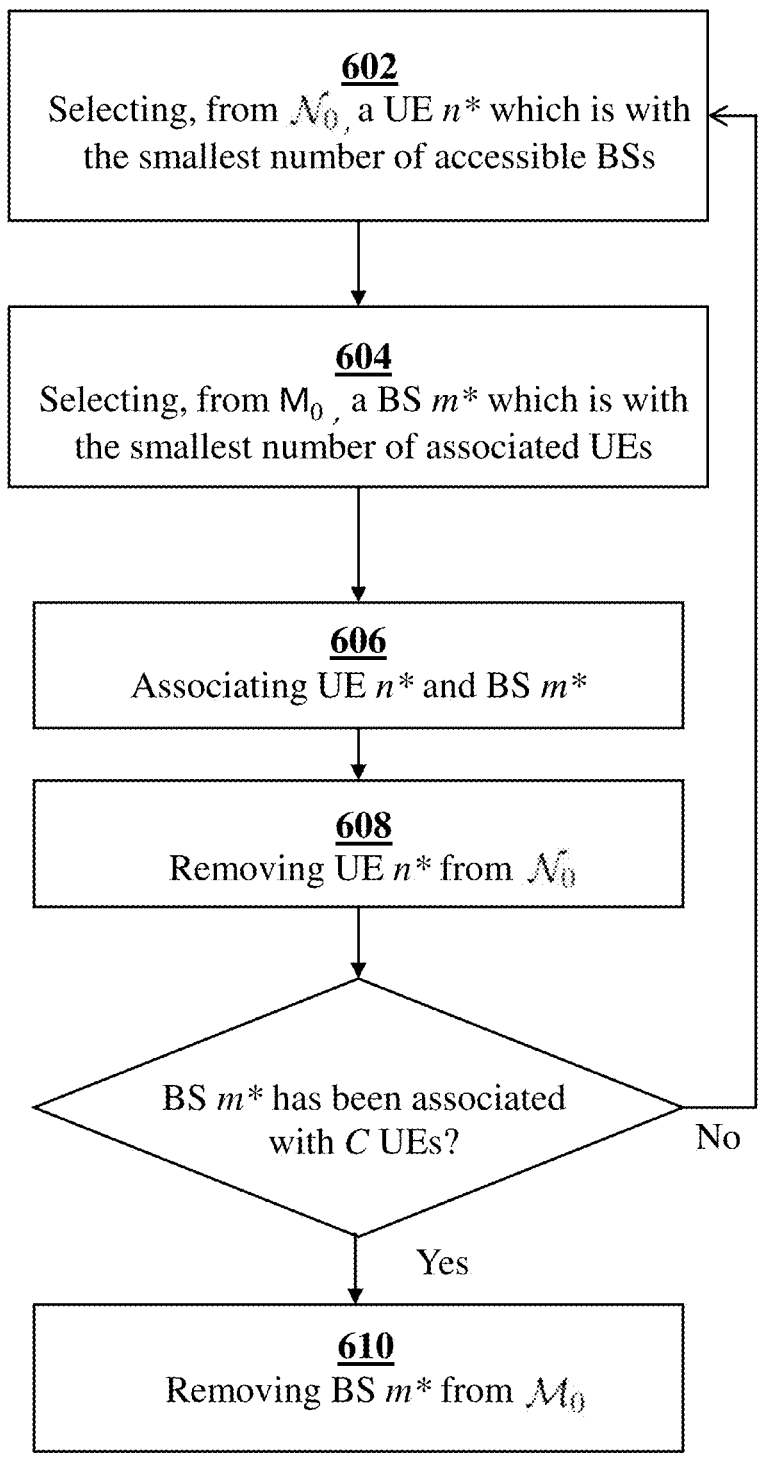
FIG. 6 depicts steps of the low-complexity sub-optimal user association algorithm according to one embodiment of the present invention.

FIG. 5 depicts steps of the low-complexity sub-optimal user association scheme according to one embodiment of the present invention. Referring to FIG. 5, the low-complexity sub-optimal user association scheme may include the steps of:

502: initiating a candidate set of BSs, $\mathcal{M}_0$, by letting $\mathcal{M}_0$ be the M number of BSs;

504: initiating a candidate set of UEs, $\mathcal{N}_0$, by letting $\mathcal{N}_0$ be the set of UEs which have at least one physically accessible BS;

506: performing, while none of $\mathcal{M}_0$ and $\mathcal{N}_0$ is empty, a low-complexity sub-optimal user association algorithm;

FIG. 6 depicts steps of the low-complexity sub-optimal user association algorithm according to one embodiment of the present invention. Referring to FIG. 6, the low-complexity sub-optimal user association algorithm may include the steps of:

602: selecting from the candidate set of UEs, $\mathcal{N}_0$, a candidate UE n* which is with the smallest number of accessible BSs;

604: selecting from the candidate set of BSs, $\mathcal{M}_0$, a candidate BS m*, which is with the smallest number of associated UEs;

606: associating the candidate UE n* and the candidate BS n*;

608: removing the candidate UE n* from the candidate set of UEs, $\mathcal{N}_0$;

610: removing the candidate BS m* from the candidate set of BSs, $\mathcal{M}_0$ if the candidate BS m* has been associated with C UEs.

The method for minimizing outage probability in accordance with embodiments disclosed herein may be implemented using computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance with the embodiments may be executed in one or more computing devices including server computers, personal computers, laptop computers, mobile computing devices such as smartphones and tablet computers.

The embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units in accordance with various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A method for arranging base stations in a communication network, comprising the steps of:
designing an optimal deployment of an M number of base stations (BSs), including optimized positions of the plurality of BSs, $r^{BS*}$, serving for an N number of user equipment (UEs), in an urban area $\mathcal{A}$ with a building-block geometry, to maximize a long-term performance of an average number of accessible BSs, $\bar{M}_{ac}$, with a sample of positions of the N number of UEs, under a bounded inaccessible probability constraint; and
matching the N number of UEs with the M number of BSs based on the optimized positions of the M number of BSs, $r^{BS*}$, in a given time slot to minimize an outage probability, Po, which is defined as the proportion of the N number of UEs that cannot associate with any of the M number of BSs, under a first matching constraint that a UE n can associate with a BS m only if the BS m is physically accessible for the UE n, a second matching constraint that each of the M number BSs has a maximum workload, and a third matching constraint that each UE can only associate with one BS, where m=1, 2, . . . , M, and n=1, . . . , N.

2. The method of claim 1, wherein the bounded inaccessible probability constraint is defined as that a long-term average performance of the inaccessible probability $P_{iac}$ is equal or smaller than a bounded value.

3. The method of claim 2, wherein:
the inaccessible probability, $P_{iac}$, is dependent on coverage and blockage performance of the communication network; and
the average number of accessible BSs, $\bar{M}_{ac}$, is dependent on coverage and blockage performance of the communication network.

4. The method of claim 3, wherein the optimized positions of the M number of BSs, $r^{BS*}$, are determined by using a cooperative stochastic approximation (CSA) based scheme.

5. The method of claim 4, wherein the CSA-based scheme comprises the steps of:
setting initial positions of the M number of BSs, $r^{BS}(0)$; and
iteratively updating the positions of the M number of BSs by performing a T number of iterations of a CSA-based algorithm;
wherein a $t^{th}$ iteration of the CSA-based algorithm, for an iteration index t=0, . . . , T−1, includes the steps of:
determining, with a sample of the N number of UEs' positions $r^{UE}(t)$, a stochastic gradient $\omega_{BS}^{out}(t)$ related to a plurality of out-of-coverage indicator functions $\mathcal{I}_{m,n\ m,n}^{out\ block}(t)$ at the $t^{th}$ iteration;
determining, with the sample of the N number of UEs' positions $r^{UE}(t)$, a stochastic gradient $\tilde{\omega}_{BS}^{block}(t)$ related to a plurality of blockage indicator functions $\mathcal{I}_{m,n\ m,n}^{out\ block}(t)$ at the $t^{th}$ iteration;
determining a step size $\eta^{out}(t)$ based on the determined stochastic gradient $\omega_{BS}^{out}(t)$;

determining a step size $\eta^{block}(t)$ based on the determined stochastic gradient $\tilde{\omega}_{BS}^{block}(t)$;

updating positions of the M number of BSs from $r^{BS}(t)$ to $r^{BS}(t+1)$ based on the determined stochastic gradients $\tilde{\omega}_{BS}^{out}(t)$ and $\tilde{\omega}_{BS}^{block}(t)$, the determined step sizes $\eta^{out}(t)$ and $\eta^{block}(t)$; and determining, with the updated positions of the M number of BSs, $r^{BS}(t+1)$, an updated unbiased estimation of inaccessible probability, $\hat{P}_{iac}(t+1)$;

assigning the updated positions of the M number of BSs, $r^{BS}(t+1)$, as the optimized positions of the M number of BSs, $r^{BS*}$, if the updated unbiased estimation of inaccessible probability, $\hat{P}_{iac}(t+1)$, is smaller or equal to the bounded value $P_{iac}^*$.

6. The method of claim 1, wherein the matching of the N number of UEs with the M number of BSs is performed by using a low-complexity sub-optimal user association algorithm.

7. The method of claim 6, wherein the low-complexity sub-optimal user association algorithm comprises:

initiating a candidate set of BSs, $\mathcal{M}_0$, by letting $\mathcal{M}_0$ be the M number of BSs;

initiating a candidate set of UEs, $\mathcal{N}_0$, by letting $\mathcal{N}_0$ be the set of UEs which have at least one physically accessible BS;

performing, while none of $\mathcal{M}_0$ and $\mathcal{N}_0$ is empty, a user association process including steps of:

selecting from the candidate set of UEs, $\mathcal{N}_0$, a candidate UE n* which is with the smallest number of accessible BSs, selecting from the candidate set of BSs, $\mathcal{M}_0$, a candidate BS m*, which is with the smallest number of associated UEs;

associating the candidate UE n* and the candidate BS m*;

removing the candidate UE n* from the candidate set of UEs, $\mathcal{N}_0$;

removing the candidate BS m* from the candidate set of BSs, $\mathcal{M}_0$ if the candidate BS n* has been associated with C UEs.

8. A system for communication network base station arrangement, comprising a processor configured to:

design an optimal deployment of an M number of base stations (BSs), including optimized positions of the plurality of BSs, $r^{BS*}$, serving for an N number of user equipment (UEs), in an effective area $\mathcal{A}$ with a building-block geometry, to maximize a long-term performance of an average number of accessible BSs, with a sample of positions of the N number of UEs, under a bounded inaccessible probability constraint; and match, based on the optimized positions of the M number of BSs, $r^{BS*}$, the N number of UEs with the M number of BSs, in a given time slot, to minimize an outage probability, Po, which is defined as the proportion of the N number of UEs that cannot associate with any of the M number of BSs, under a first matching constraint that a UE n can associate with a BS m only if the BS m is physically accessible for the UE n, a second matching constraint that each of the M number BSs has a maximum workload, and a third matching constraint that each UE can only associate with one BS.

9. The system of claim 8, wherein the bounded inaccessible probability constraint is defined as that a long-term average performance of the inaccessible probability $P_{iac}$ is equal or smaller than a bounded value.

10. The system of claim 9, wherein the inaccessible probability, $P_{iac}$, is dependent on coverage and blockage performance of the communication network and the average number of accessible BSs, $\underline{M}_{ac}$, is dependent on coverage and blockage performance of the communication network.

11. The system of claim 10, wherein the processor is further configured to determine the optimized positions of the M number of BSs, $r^{BS*}$, by using a cooperative stochastic approximation (CSA) based scheme.

12. The system of claim 11, wherein the CSA-based scheme comprises the steps of:

setting initial positions of the M number of BSs, $r^{BS}(0)$;

iteratively updating the positions of the M number of BSs by performing a T number of iterations of a CSA-based algorithm, for an iteration index $t=0, \ldots, T-1$, and wherein a $t^{th}$ iteration including the steps of:

determining, with a sample of the N number of UEs' positions $r^{UE}(t)$, a stochastic gradient $\tilde{\omega}_{BS}^{out}(t)$ related to a plurality of out-of-coverage indicator functions $\mathcal{I}_{m,n\ m,n}^{out\ out}(t)$ at the $t^{th}$ iteration;

determining, with the sample of the N number of UEs' positions $r^{UE}(t)$, a stochastic gradient $\tilde{\omega}_{BS}^{block}(t)$ related to a plurality of blockage indicator functions $\mathcal{I}_{m,n\ m,n}^{out\ block}(t)$ at the $t^{th}$ iteration;

determining a step size $\eta^{out}(t)$ based on the determined stochastic gradient $\tilde{\omega}_{BS}^{out}(t)$;

determining a step size $\eta^{block}(t)$ based on the determined stochastic gradient $\tilde{\omega}_{BS}^{block}(t)$;

updating positions of the M number of BSs from $r^{BS}(t)$ to $r^{BS}(t+1)$ based on the determined stochastic gradients $\tilde{\omega}_{BS}^{out}(t)$ and $\tilde{\omega}_{BS}^{block}(t)$, the determined step sizes $\eta^{out}(t)$ and $\eta^{block}(t)$; and determining, with the updated positions of the M number of BSs, $r^{BS}(t+1)$, an updated unbiased estimation of inaccessible probability, $\hat{P}_{iac}(t+1)$;

assigning the updated positions of the M number of BSs, $r^{BS}(t+1)$, as the optimized positions of the M number of BSs, $r^{BS*}$, if the updated unbiased estimation of inaccessible probability, $\hat{P}_{iac}(t+1)$, is smaller or equal to the bounded value $P_{iac}^*$.

13. The system of claim 12, wherein the processor is further configured to use a low-complexity sub-optimal user association algorithm for matching the N number of UEs with the M number of BSs.

14. The system of claim 13, wherein the low-complexity sub-optimal user association algorithm comprises:

initiating a candidate set of BSs, $\mathcal{M}_0$, by letting $\mathcal{M}_0$ be the M number of BSs;

initiating a candidate set of UEs, $\mathcal{N}_0$, by letting $\mathcal{N}_0$ be the set of UEs which have at least one physically accessible BS;

performing, while none of $\mathcal{M}_0$ and $\mathcal{N}_0$ is empty, a user association process including steps of:

selecting from the candidate set of UEs, $\mathcal{N}_0$, a candidate UE n* which is with the smallest number of accessible BSs, selecting from the candidate set of BSs, $\mathcal{M}_0$, a candidate BS m*, which is with the smallest number of associated UEs;

associating the candidate UE n* and the candidate BS m*;

removing the candidate UE n* from the candidate set of UEs, $\mathcal{N}_0$;

removing the candidate BS m* from the candidate set of BSs, $\mathcal{M}_0$ if the candidate BS m* has been associated with C UEs.

\* \* \* \* \*